Aug. 23, 1960  N. M. SULLIVAN  2,950,014
CONVEYOR-TYPE ARTICLE STORAGE RACK HAVING LIFT-OUT RAIL SECTIONS
Filed March 7, 1957  2 Sheets-Sheet 2

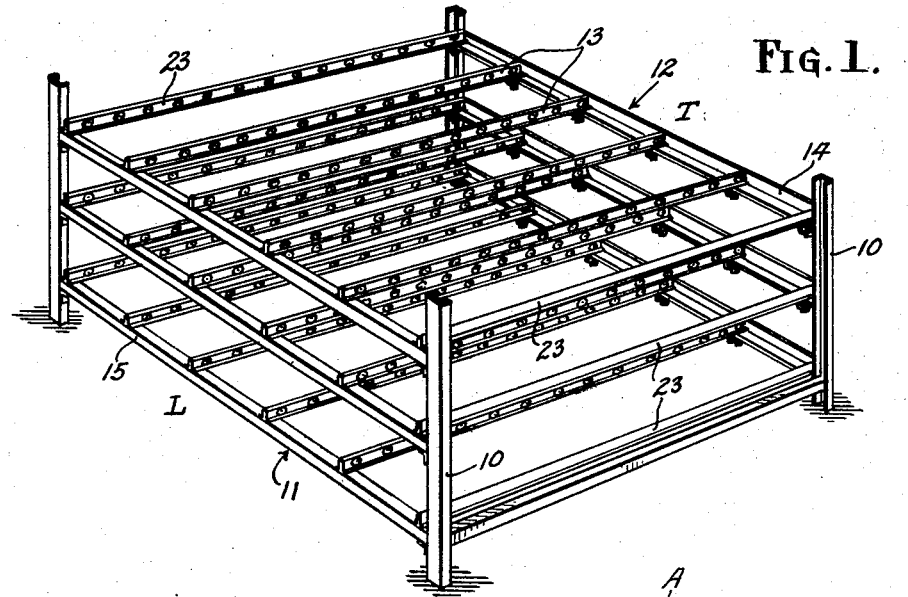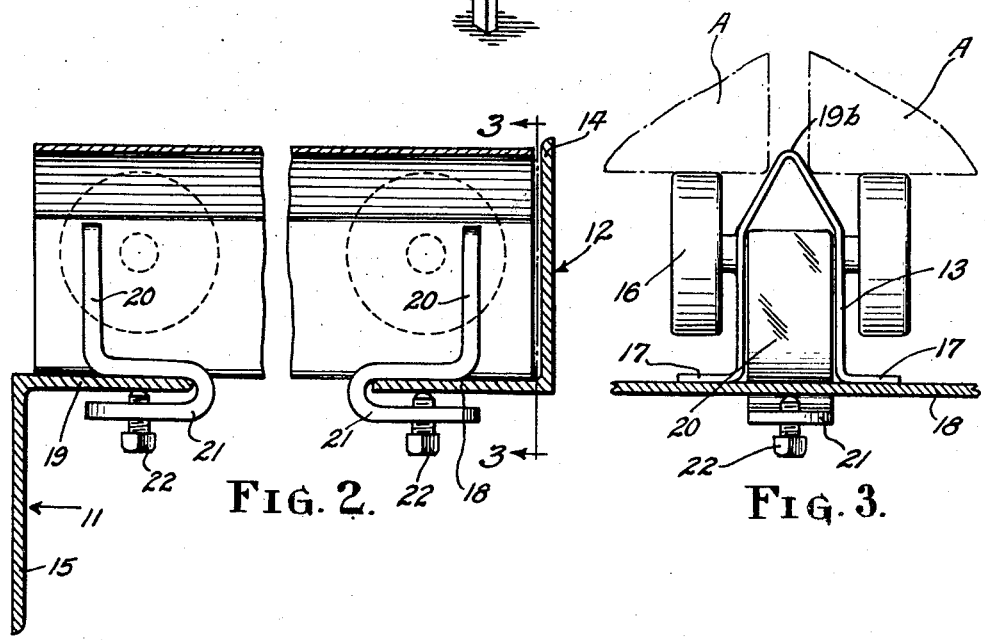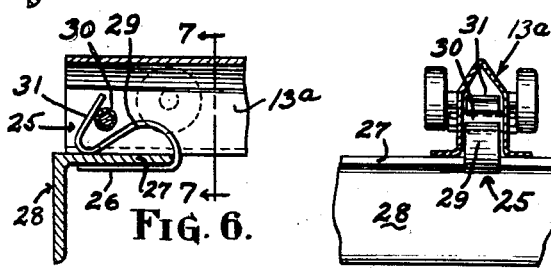

INVENTOR
*Norman M. Sullivan*

BY *W. A. Rambo*
ATTORNEY

United States Patent Office 2,950,014
Patented Aug. 23, 1960

2,950,014

CONVEYOR-TYPE ARTICLE STORAGE RACK HAVING LIFT-OUT RAIL SECTIONS

Norman M. Sullivan, Cincinnati, Ohio, assignor to The Alvey-Ferguson Company, Cincinnati, Ohio, a corporation of Ohio Filed Mar. 7, 1957, Ser. No. 644,671

2 Claims. (Cl. 211—151)

This invention relates to conveyor-type storage racks. It has to do, more specifically, with that type of storage rack which includes decks composed of conveyor rails upon which the stored articles are supported for automatic movement from the loading side to the take-out side of the rack as the articles are removed at the take-out side.

The conveyor rails used in a rack of this type generally include supporting rail sections which carry antifriction rollers or wheels that actually support the articles. These rails are arranged in rows with each article usually supported by the wheels of two or more of the rails and the rails are slightly inclined to gravitationally feed the articles towards the take-out side of the rack. Ordinarily, these rails function without any trouble to properly feed the articles towards the take-out side. However, it sometimes happens that the articles of a row become askew causing clogging or jamming of the particular row or the row becomes jammed for other reasons. If this jamming occurs in an inner row, the only way in which access can be had thereto is from an end or side of the rack and this is very difficult with prior art racks because the rails are fastened in position by bolts or other fastening devices which must be removed with tools. Obviously, if a number of these rails must be removed in order to reach the jammed row, considerable labor and time is required.

It is the main object of the present invention to provide a storage rack of the general type indicated above in which the rails are accurately and properly located in predetermined spaced parallel relation to one another by means which permits ready removal of the rails by a simple lifting action without the use of any tools.

In the accompanying drawings, one embodiment of this invention is illustrated but it is to be understood that details thereof may vary without departing from the principles of this invention.

In the drawings:

Fig. 1 is a perspective view illustrating a conveyor-type storage rack in which this invention is embodied;

Fig. 2 is a vertical sectional view illustrating the rail-locating members of this invention;

Fig. 3 is a transverse sectional view taken along line 3—3 of Fig. 2;

Fig. 6 is a fragmentary longitudinal vertical sectional view on a relatively reduced scale showing another modified form of combined rail-locating and stop member;

Fig. 7 is a transverse vertical sectional view taken along the line 7—7 of Fig. 6.

Figure 4:
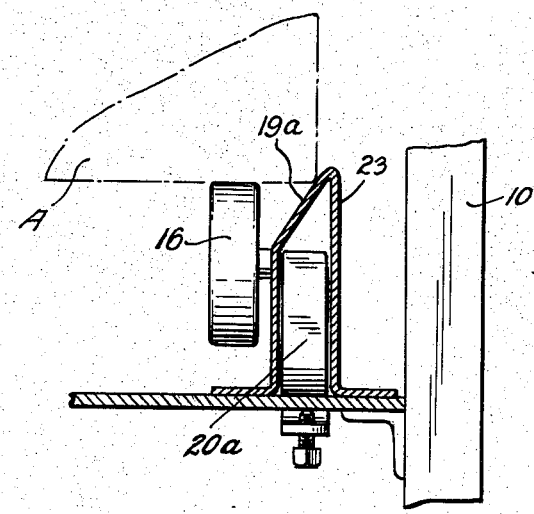
Fig. 4 is a similar view but showing a slightly different rail-locating member which is used on an outside rail.

With reference to the drawings, in Fig. 1 a storage rack of the general type to which this invention relates is illustrated. This rack can be fabricated in various ways to provide a plurality of storage decks. These racks are usually used in large storage rooms and may be built up to almost fill the area of the room and with a large number of decks sometimes extending from floor to ceiling.

The rack is illustrated as comprising stationary vertical columns or posts 10 supporting the transversely extending beams or cross supports 11 at the loading side L of the rack and the transversely extending angle supports 12 at the take-out side T of the rack. These angle supports 11 and 12 are secured in vertically spaced relationship to the respective posts 10 in any suitable manner. The transversely extending angle supports 11 and 12 support the conveyor rails 13 which extend from the loading side L of the conveyor rack to the take-out side T thereof. The conveyor rails 13 are disposed in laterally spaced parallel relationship and are inclined slightly from the loading side L to the take-out side T. The articles A are usually arranged in rows, each article of which is supported on the opposed sets of wheels of at least a pair of the conveyor rails 13. Since the rails are inclined, as indicated above, articles supported thereby will automatically feed towards the take-out side T as articles are loaded at the loading side L or are removed at the take-out side T. It will be noted from Figs. 1 and 2, that the angle supports 12, at the take-out side T of the rack, are so disposed that the vertical flange 14 of each is upturned and serves as a stop for the outermost article of each row of a particular deck of the rack. However, the angle support 11, at the loading side L, is reversed so that its vertical flange 15 is downturned to facilitate loading of the articles in each row of that particular deck.

The conveyor rails 13, indicated generally in Fig. 1, comprise supporting rail sections which carry article-supporting rollers 16. It is necessary that these rails be supported on the transverse supports 11 and 12 in accurately spaced parallel relationship. Also, it is desirable, in accordance with this invention, to locate these rails by locating means which will permit removal of the rails from the supports merely by a lifting section. For this purpose, the arrangement illustrated in Figs. 2, 3 and 4 is suitable.

Each of the inner rails 13, which define the sides of each lane of the rack, is of the type shown in Figs. 2 and 3 and is in the form of an inverted channel section which has the outwardly turned flanges 17 on its lower edges that rest on the horizontal flange 18 of the angle support 12 or on the horizontal flange 19 of the angle support 11. The closed top of the channel section of the rail is provided with converging walls which form the upstanding guide rib 19b of the inverted V-form. The rollers 16 are carried by the sides of the channel section and their top surfaces are at a level slightly below the peak of the rib 19b. Thus, articles A supported by the adjacent rails 13 will be properly located laterally by the oppositely inclined surfaces of the ribs 19b of adjacent rails 13.

To locate each rail 13 laterally, an upstanding locating member 20 is provided on each transverse support 11 and 12. The locating member 20 shown is in the form of an upstanding lug of slightly less width than the inverted channel so that it can extend upwardly into the channel in transverse relationship thereto and will prevent lateral movement thereof. The lower end of the member 20 is provided with a hook 21 which fits around the supporting flanges 18 and 19 and which is provided with a setscrew 22 threaded upwardly into contact with the flange so that the locating member 20 can be set at selected positions along the support flange. Thus, it will be apparent that the members 20 will locate the rails 13 along the transverse supports 11 and 12, but that to remove the rail from its supports it is merely necessary to lift the rail off the upstanding locating member 20.

The end rails 23 of the rack are slightly different from the inner rails as indicated by a comparison of Figs. 3 and 4. The rail shown in Fig. 4 is an end rail and is substantially one-half the channel structure of the rail of Fig. 3 being provided with a guide rib 19a which has one surface only inwardly inclined. This rail carries the rollers 16a at the inner side only thereof. The locating member 20a will be exactly as before except that it will be of less width.

It will be apparent that according to this invention, locating members are provided which extend up into downwardly opening channels or sockets in the conveyor rails for accurately locating the rails laterally of their supporting structures. These locating members in the particular form shown are laterally adjustable along the supports and can be adjusted to vary the spacing of the rails. It is to be understood, however, that this invention is not limited to the particular type of transverse supports shown nor the particular type of conveyor rails shown. The important feature of this invention is to provide locating members for the rails which permit removal of the rails from their supports merely by a simple lifting action.

Figure 5:
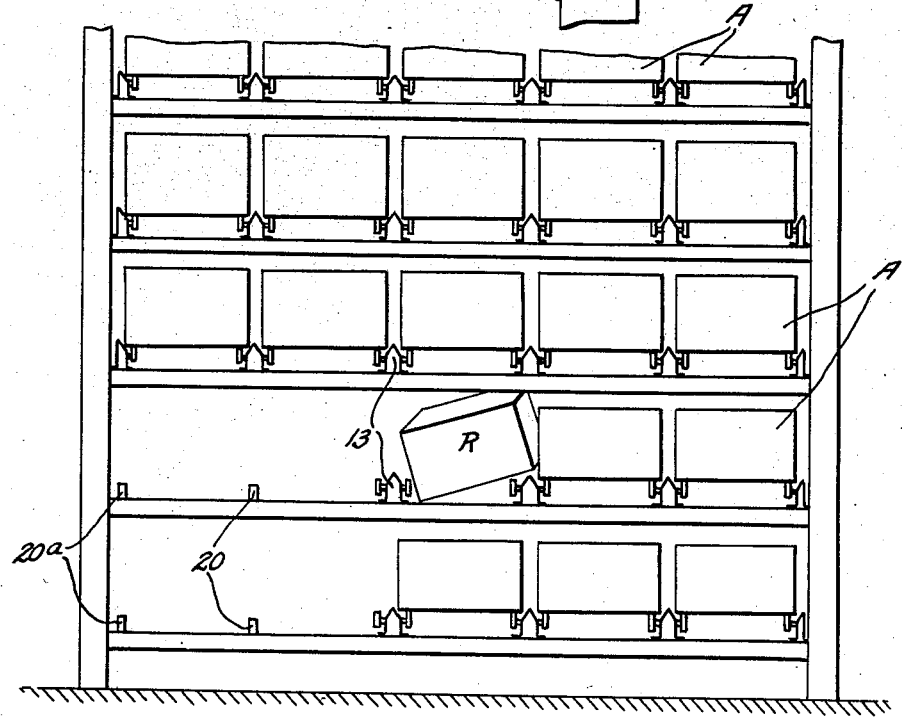
Fig. 5 is a schematic view illustrating how some of the rails may be lifted out of place to reach a jammed row of stored articles.

In Fig. 5, the main purpose of this invention is illustrated schematically. In this figure, the rack is shown loaded with a plurality of rows of the articles A in a plurality of decks. Assuming that there is trouble in one of the inner rows which, for example, may be the row R which is the third row in and in the second deck up. To gain access to this row R, it will be necessary to remove the first and second rows of the two lower decks. This is accomplished readily, according to this invention, because after the articles are removed from the rails 13, the rails themselves can be removed with ease merely by a lifting action.

The rails 13 are preferably formed in short sections which can be handled with ease by one man. However, it is to be understood that each deck can be composed of a number of lengths of these rail sections and that transverse supports will be provided at the end of the sections.

Figs. 6 and 7 of the drawings illustrate a modified form of combined rail-locating and stop device which takes the form of the spring steel clip indicated generally by reference numeral 25. The clip 25 is formed with a relatively straight base web 26 which engages beneath the horizontal flange 27 of the transverse angle iron supports 28 of the rack frame, and an upwardly bowed, reversely turned intermediate portion 29 which extends upwardly into the open channel of the conveyor rail 13a. The rail 13a is identical to the rail 13 except that the rail 13a is provided at its downwardly inclined end with a transverse stop bolt or pin 30 which extends between the side walls of the rail 13a. The intermediatae web or portion 29 of the clip terminates at its opposite end in an upwardly turned hook member 31 which is arranged to receive the pin 30 of the rail and thereby hold the rail against both transverse and longitudinal displacement. Due to the reversely bowed configuration between the base web 26 and intermediate web 29 of the clip, the same is clamped tightly to the flange 27 of the transverse support independently of any set screws or other fastening devices. However, the frictional fit between the clips 25 and the transverse supporting members 28 enables the clip 25 and associated rails 13a to be slid transversely across the supporting members 28, as a unit, to adjust the transverse spacing between the individual rails 13a of the rack. At the same time, the rails 13a may be easily and readily lifted free of the clips and transverse supports 28, due to the limited resilient flexibility of the hook-forming member 31 of the clip 25, in substantially the same manner as with the rail locating member 20 shown in Figs. 2 and 3 of the drawings.

It will be apparent that this invention provides a storage rack in which the conveyor rails are accurately and properly located by simple interfitting means between the rails and their supports which permits removal of the rails merely by a lifting action and without the use of any tools.

I claim:

1. In a conveyor-type storage rack; a generally rectangular, stationary frame structure including a plurality of upstanding posts and a plurality of substantially horizontally disposed, transversely extending, cross supports carried by said posts at each end of said frame structure; a plurality of relatively spaced, parallel article-conveying rails extending longitudinally of said frame and supported at their opposite ends upon the cross supports of said frame for adjustment transversely of said frame, each of said rails having a downwardly opening socket at each end thereof; and a plurality of rail-locating devices connected with said cross supports and adjustable longitudinally thereof to different transverse positions on said frame, each of said rail-locating devices having a generally upstanding portion thereon extending into the downwardly opening socket of one of said rails to hold the latter in a given, transversely adjusted position on said frame, but permitting upward removal of said rail from said cross supports.

2. A conveyor-type storage rack as defined in claim 1, wherein each of said rail-locating devices comprises a spring clip having a lower portion frictionally engaged with a cross support of said frame so as to be forcibly slidable longitudinally of such cross support.

References Cited in the file of this patent

UNITED STATES PATENTS

| 1,563,116 | Tinsley | Nov. 24, 1925 |
| 2,282,881 | Ostrow | May 12, 1942 |
| 2,345,650 | Attwood | Apr. 14, 1944 |
| 2,434,360 | Hess | Jan. 13, 1948 |
| 2,480,304 | Pelton | Aug. 30, 1949 |
| 2,706,609 | Sullivan | Apr. 19, 1955 |
| 2,786,578 | De Graaf | Mar. 26, 1957 |

OTHER REFERENCES

"Live Rail," The Alvey-Ferguson Co., Cincinnati 9, Ohio, copyright 1953. (Copy Div. 28.)